United States Patent [19]

Fujisawa et al.

[11] 3,878,558

[45] Apr. 15, 1975

[54] PHASE COMPENSATING SYSTEM

[75] Inventors: Seiji Fujisawa, Ikoma; Hiroyuki Irie, Osaka; Tsutomu Kobayashi, Kadoma; Kosaku Uchida, Neyagawa, all of Japan

[73] Assignee: Matsushita Electric Industrial Co., Ltd., Osaka, Japan

[22] Filed: Oct. 6, 1972

[21] Appl. No.: 295,543

[30] Foreign Application Priority Data

Oct. 8, 1971 Japan ................................ 46-79652
Oct. 31, 1971 Japan ................................ 46-86472
Nov. 1, 1971 Japan ................................ 46-87047

[52] U.S. Cl. .................................................. 358/28
[51] Int. Cl. ............................................ H04n 9/12
[58] Field of Search ...... 178/5.4 R, 5.4 HE, 5.4 SY, 178/69.5 CB; 358/28

[56] References Cited

UNITED STATES PATENTS 3,708,613 1/1973 Nakabe et al. ................ 178/5.4 HE
3,708,614 1/1973 Nakabe et al. ................ 178/5.4 HE
3,715,471 2/1973 Nakabe et al. ................ 178/5.4 HE

OTHER PUBLICATIONS

Television Engineering Handbook, Fink, 7th Ed., 1957, 1957 pp. 9–46 and 9–50.

*Primary Examiner*—Robert L. Richardson
*Attorney, Agent, or Firm*—Stevens, Davis, Miller & Mosher

[57] ABSTRACT

A phase compensating system for phase compensating a signal having phase information, such as an NTSC chrominance signal, by partly suppressing a phase modulated signal to a predetermined level by using a signal having a period in an integral multiple relation to the period of a reference carrier signal and effecting phase compensation of the fundamental frequency component of the output of the suppressing device toward a predetermined phase. When it is applied to a color television receiver, it can provide excellent compensation for hue deviation in the reproduction due to phase distortion introduced by the transmission system and so forth.

10 Claims, 9 Drawing Figures

PHASE COMPENSATING SYSTEM

This invention relates to phase compensating systems.

Usually, the hue reproduced on color television receivers is subject to undesired deviations due to such factors as errors in the hue adjustment or phase distortions introduced by the transmission system, and every time such hue deviation results it has been necessary to correct it by manipulating the hue adjustment knob on the receiver.

The conventional NTSC type color television receiver is equipped with a hue control circuit for automatic hue control. However, the disadvantage of such a device is that variations in hue occur for the following reasons:

a. A distortion of a reference phase, etc., in a transmitting system.

b. An error in camera adjustment.

c. An out of phase condition of a burst signal due to a reason attributable to a broadcasting station.

d. A phase characteristic of a receiver component including an antenna.

e. The out of phase condition of a sub-carrier due to a temperature characteristic of a crystal in a receiver.

To cope with this drawback, there have heretofore been proposed various methods of correcting or compensating the hue. One such method consists of detecting any phase error or phase distortion within a predetermined range introduced on the transmission side or during transmission and producing from the detection signal a phase correction signal for combination with the original transmitted signal. This method, however, requires complicated and hence expensive circuit construction. Also, with this method it has been difficult to ensure steady and reliable operation.

The present invention is intended to obviate the above difficulties, and its object is to provide phase compensation of a signal bearing phase information with respect to a preset phase.

Another object of the invention is to also automatically compensate amplitude variations resulting from the phase compensation.

A further object of the invention is to enable the removal of hue deviation and various other inconveniences resulting therefrom in the color television receiver due to such factors as phase distortion, to thereby obtain excellent hue reproduction.

A still further object of the invention is to enable freely varying the hue from a particular hue according to the viewer's taste.

The above and other objects, features and advantages of the invention will become more apparent from the following description of preferred embodiments having reference to the accompanying drawings, in which.

Figure 1:
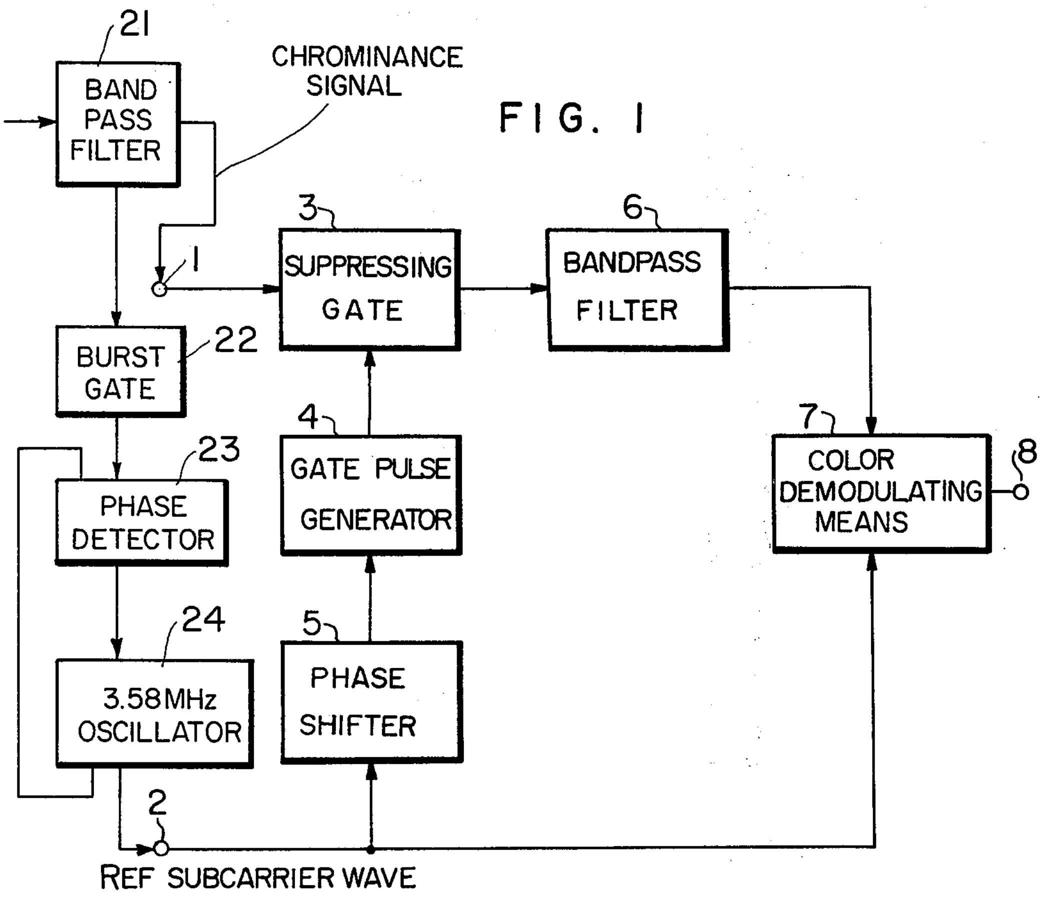
FIG. 1 is a block diagram showing an embodiment of the invention applied to a color television receiver.

FIG. 1 shows part of an NTSC color television receiver circuit incorporating the invention. Referring to the Figure, reference numeral 1 designates an input terminal to which a chrominance signal is coupled, numeral 2 a terminal to which a reference subcarrier signal is added, numeral 3 a suppressing gate, numeral 4 a gate pulse generator, numeral 5 a phase shifter, numeral 6 a bandpass filter, numeral 7 a color demodulating means, numeral 8 an output terminal, numeral 21 a band pass filter receiver, numeral 22 a burst gate circuit, numeral 23 a phase detector, and numeral 24 a 3.58 MHz oscillator.

Figure 2:
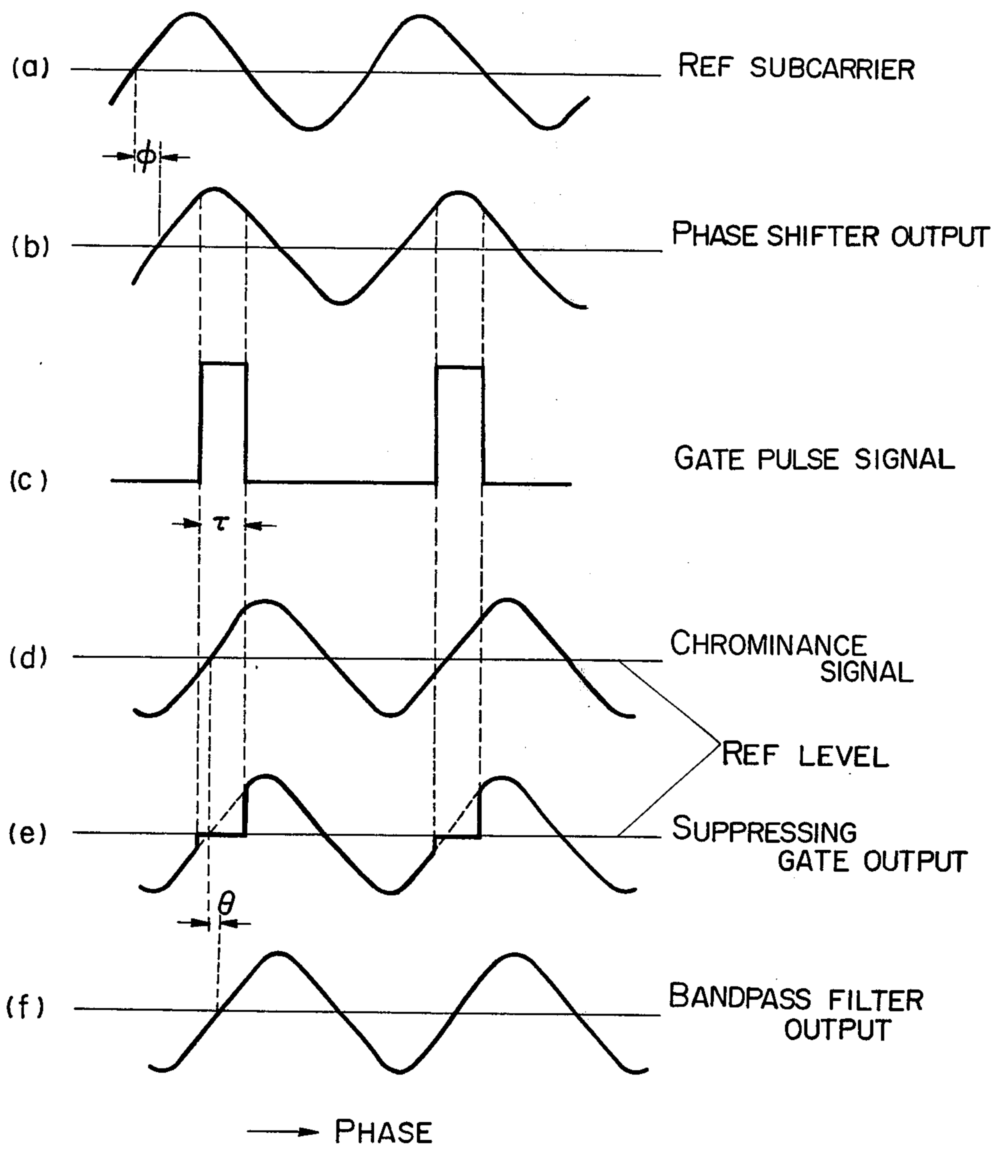
FIGS. 2 and 3 are waveform charts to illustrate the operation of the system of FIG. 1.
Figure 3:
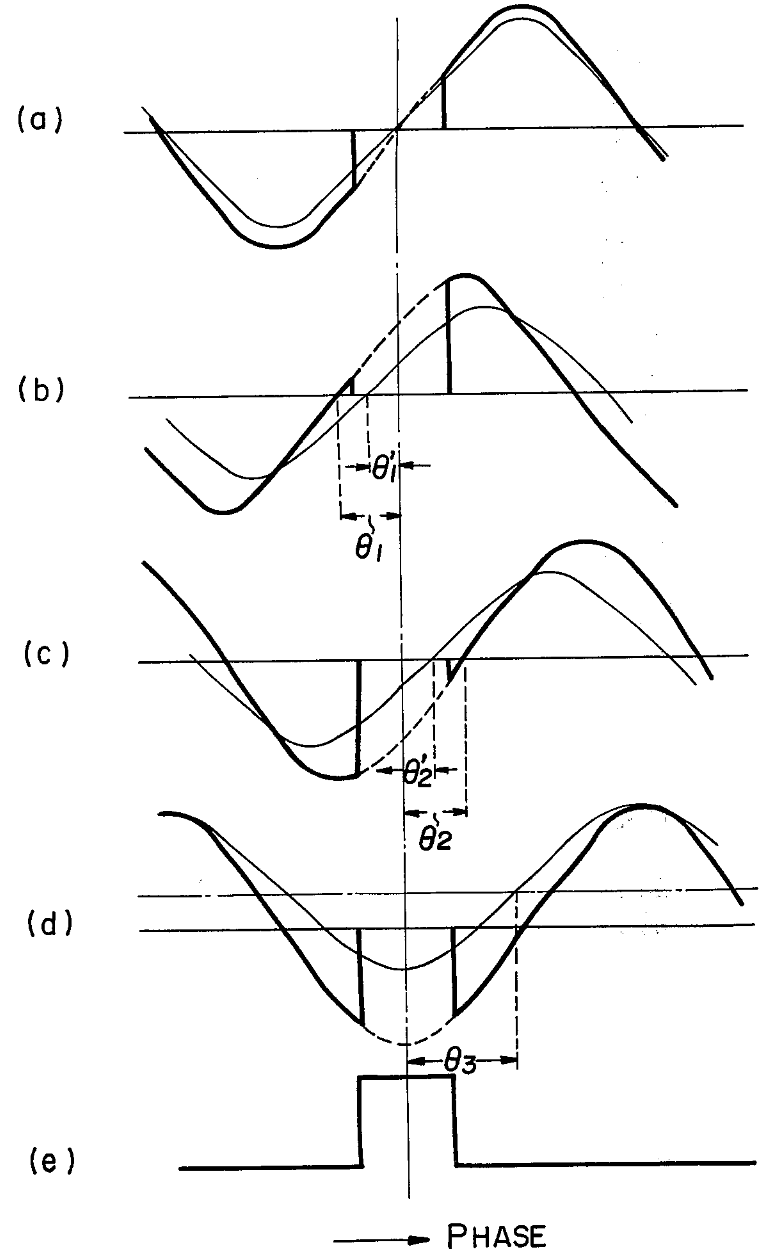

FIGS. 2 and 3 show waveforms involved in the operation of the embodiment of FIG. 1 to be described hereinafter.

A reference color subcarrier wave shown at (a) in FIG. 2 is coupled to the phase shifter 5 to produce a signal out of phase by $\phi$ with respect to the input reference subcarrier as indicated at (b). This signal (b) is added to the gate pulse generator 4 to produce a gate pulse signal indicated at (c).

Meanwhile, a chrominance signal indicated at (d) is coupled to the suppressing gate 3, so that it may be partly suppressed to a reference level during the pulse interval of the gate pulse signal (c). The reference level here means, for instance, zero level of an a-c signal. In the case where the a-c signal and d-c signal are superimposed one upon another, the d-c signal level constitutes the reference level.

The suppressing gate 3 thus produces a partly suppressed signal as indicated at (e). It is well known that such signal (e) contains a fundamental frequency component having the same period as the original signal (d) and its harmonic components. The output of the gate 3 is thus coupled to the bandpass filter 6 to separate only its fundamental frequency component as indicated at (f). This signal (f) is out of phase by $\theta$ with respect to the original signal (d).

The phase deviation angle $\theta$ depends upon the relation between the phase of the input chrominance signal (d) and the phase of the gate pulse signal (c). It also depends upon the pulse width ($\tau$) of the gate pulse.

FIG. 3 shows various phases of the fundamental frequency component of the suppressing gate output signal, i.e., the phase of the bandpass filter output signal, for different phases of the input chrominance signal with respect to the phase of the gate pulse.

FIG. 3(a) shows a reference phase relation between the chrominance signal and gate pulse shown in FIG. 3(e). FIGS. 3(b), 3(c) and 3(d) show exemplary cases where the phase of the chrominance signal leads by $\theta_1$, lags behind by $\theta_2$ and lags behind by $\theta_3$ compared to the case of FIG. 3(a) respectively. In FIGS. 3(a) to 3(d), the bold curve represents the output of the suppressing gate 3, and the thin curve represents the fundamental frequency component of the gate output.

In the case of FIG. 3(a), the chrominance signal and the fundamental component of the suppressing gate output are in phase with each other. In cases of FIGS. 3(b) and 3(c), while the phase of the chrominance signal is deviated respectively by $\theta_1$ and by $\theta_2$ from that in case of FIG. 3(a), the phase deviation of the fundamental frequency component of the suppressing gate output is only $\theta_1'$ and $\theta_2'$ respectively. In the case of FIG. 3(d), the phase of the chrominance signal deviates by $\theta_3 = \pi/2$ from that in case of FIG. 3(a). In this case, the phase deviation of the fundamental frequency component of the suppressing gate output is also $\theta_3$, that is, in this case the chrominance and the fundamental component of the suppressing gate output are in phase with each other.

Usually, the chrominance signal and the suppressing gate output fundamental frequency component are different in amplitude and reference level, as most clearly seen in case of FIG. 3(d), but this leads to no problem here. The difference in amplitude may be compensated by appropriately varying the amplification degree of an amplifier provided after the supressing gate 3, as will be described hereinafter. The difference in the reference level gives no problem, for the gate output is passed through the bandpass amplifier.

Figure 4:
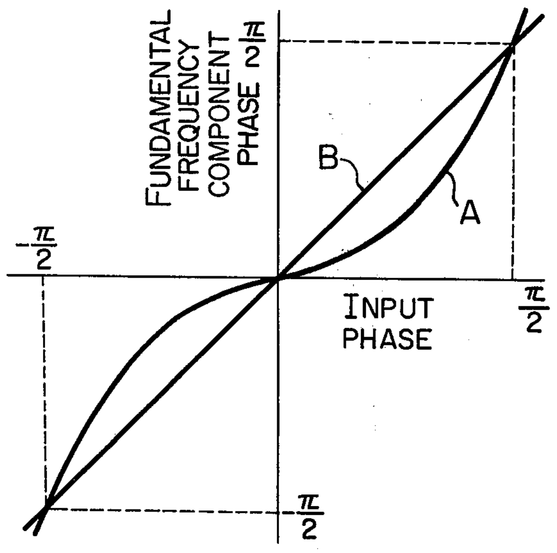
FIG. 4 is a graph showing input-output phase relations in the embodiment of FIG. 1.

FIG. 4 shows an example of the input-output phase characteristic (curve A) of the suppressing gate. In the Figure, the abscissa is taken for the input phase, i.e., the phase of the chrominance signal, and the ordinate is taken for the phase of the fundamental frequency component of the output. As is shown, while the fundamental frequency component is in phase with the input at 0 and $\pm\pi/2$, otherwise its phase is more or less deviated toward 0. Curve B in FIG. 4, which is given for the sake of reference, is obtained in case of absence of the function of the suppressing gate.

Figure 5:
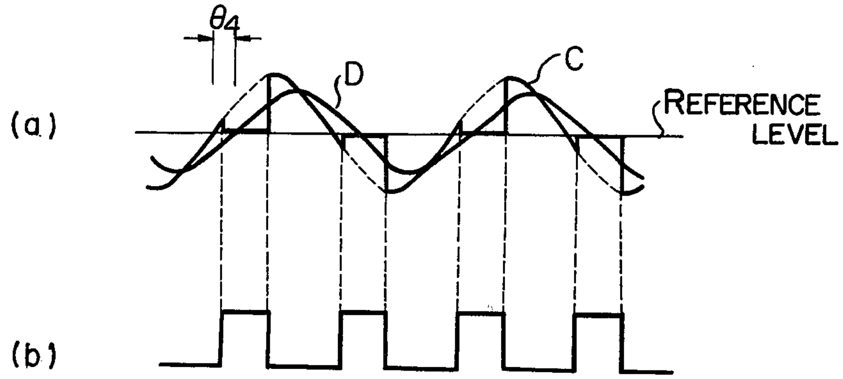
FIG. 5 is a waveform chart to illustrate a modification of the operation mode illustrated in FIGS. 2 and 3.

FIG. 5 shows a different mode of operation of the embodiment of FIG. 1. In this mode, a gate pulse signal whose period is one half of the period of the reference subcarrier wave is used. More particularly, curve C in FIG. 5(a) represents the output waveform on the output side of the suppressing gate 3, and curve D represents the fundamental frequency component contained in the gate output. There is a phase difference of angle $\theta_4$ between the input to the suppressing gate and the fundamental frequency component in the gate output. FIG. 5(b) shows the gate pulse signal in this mode. It is to be emphasized that the period of the gate pulse signal need not coincide with the period of the input to the suppressing gate, but similar effects may be obtained insofar as there is an integral multiple relation between the two.

The input signal to the suppressing gate 3 has phase information as mentioned above. In general, it may also have amplitude information in addition to the phase information. One such example is a chrominance signal in the NTSC color television system. Even in such case, the system of FIG. 1 operates in connection with the phase of the suppressing gate input alone irrespective of the amplitude thereof, as has been made apparent from the description in connection with FIGS. 2, 3 and 5. Thus, amplitude deformation and other inconveniences resulting therefrom can be prevented from being introduced. This is obtained by suppressing the gate input to its reference level during the presence of the gate pulse as mentioned earlier, and this constitutes a feature of the invention.

While the basic circuit construction has been described above in connection with one embodiment thereof, the afore-mentioned suppression may be effected by so arranging that the input to the suppressing gate is either blocked or permitted in the presence of the gate pulse. Blocking the gate input in the presence of the gate pulse is technically equivalent to permitting the gate input in the presence of the gate pulse. Also, the gate signal need not be rectangular, but it may as well be sinusoidal or partly sinusoidal. Further, it is of course possible to omit the gate pulse generator 4 shown in FIG. 1 if desired.

Furthermore, it is possible to have an arrangement such that the phase compensation degree is variable by varying the width ($\tau$of the gate pulse.

With the system of FIG. 1, phase error or phase distortion introduced on the transmitting side or during tranmission may be corrected or compensated for on the side of the receiver. Thus, it is possible to always obtain correct reproduction of the hue, and the manipulation of the hue control knob on the receiver becomes almost unnecessary. Also, since the above system according to the invention is entirely different from the prior-art system based on the method of detecting any phase error or phase distortion introduced on the transmitting side or during transmission and producing from the detected signal a phase correction signal for combination with the transmitted signal, it is possible to simplify the circuit construction and hence ensure stable operation and cost reduction.

In addition, the effect of the phase compensation according to the invention may be particularly appreciated if the phase of the chrominance signal is compensated toward the phase corresponding to the human skin hue, which particularly affects the sense of sight. In this case, the phase compensation effect is also observed in the vicinity of blue or green out of phase by $\pi$ with respect to the phase of the human skin hue, but this gives no inconvenience.

Further, while the foregoing description has been concerned with a color television receiver, the system of FIG. 1 may also be applied to color television transmission equipment and to color television relay facilities. Generally, it may be more extensively applied to transmission systems dealing with signals bearing phase information in various fields inclusive of the color television field.

Furthermore, from the observation of the waveforms shown in FIGS. 2, 3 and 5 it will be seen that even if the amplitude input to the suppressing gate 3, for instance a chrominance signal, is constant, the amplitude of the phase compensated output of the bandpass filter 6 shown in FIG. 1 is no longer constant. This respect is illustrated in FIG. 6.

Figure 6:
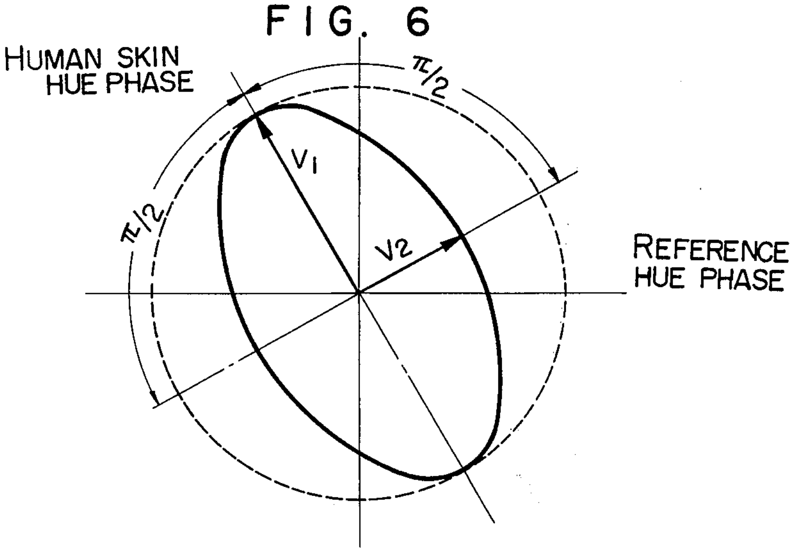
FIG. 6 is a phase diagram showing amplitude characteristics of the phase compensated signals.

In FIG. 6, the solid loop represents a characteristic obtained by the system of FIG. 1 in case the phase compensation is effected with respect to the phase corresponding to the human skin hue. In this case, a vector V2 out of phase by $\pi/2$ with respect to the vector V1 corresponding to the human skin hue is shown to have a reduced length or amplitude compared to the latter vector.

Figure 7:
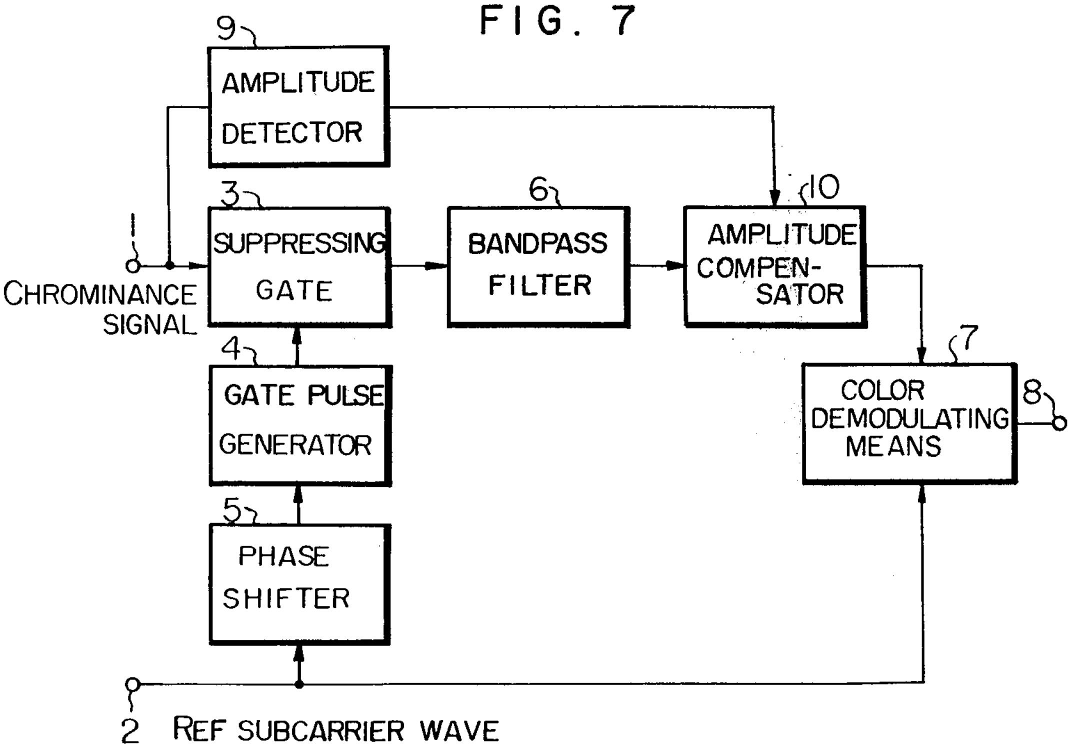
FIG. 7 is a block diagram showing another embodiment of the invention.

FIG. 7 shows another embodiment, which additionally includes an amplitude compensation means to provide for a characteristic represented by a dashed loop shown in FIG. 6. More particularly, it includes an amplitude detector 9 and an amplitude compensator 10 in addition to the component parts of the FIG. 1 system. Here, the amplitude of the chrominance signal appearing at the terminal 1 is detected by the amplitude detector 9, which may consist of an envelope detector using diodes. The amplitude detector 9 produces a signal bearing amplitude information (envelope signal), according to which the output of the bandpass filter 6 is amplitude compensated in the amplitude compensator 10. The amplitude compensator may, for instance, consist of an amplitude comparison amplifier receiving the afore-mentioned envelope signal as a reference signal. The amplitude comparison amplifier may be constructed such that its gain is automatically controlled according to the difference between the instantaneously compared input signal and the reference signal amplitude so that its output amplitude is proportional to the reference signal amplitude. Alternatively, the amplitude compensator 10 may be constructed such that the afore-mentioned envelope signal modulates a signal from a circuit removing amplitude information in the input signal and leaving only phase information, for instance a limiter.

With the preceding system of FIGS. 1 and 7, it is possible to obtain hue compensation with respect to a predetermined hue. In addition to this hue compensation, it is desirable that the hue is variable to match the taste of individuals.

Figure 8:
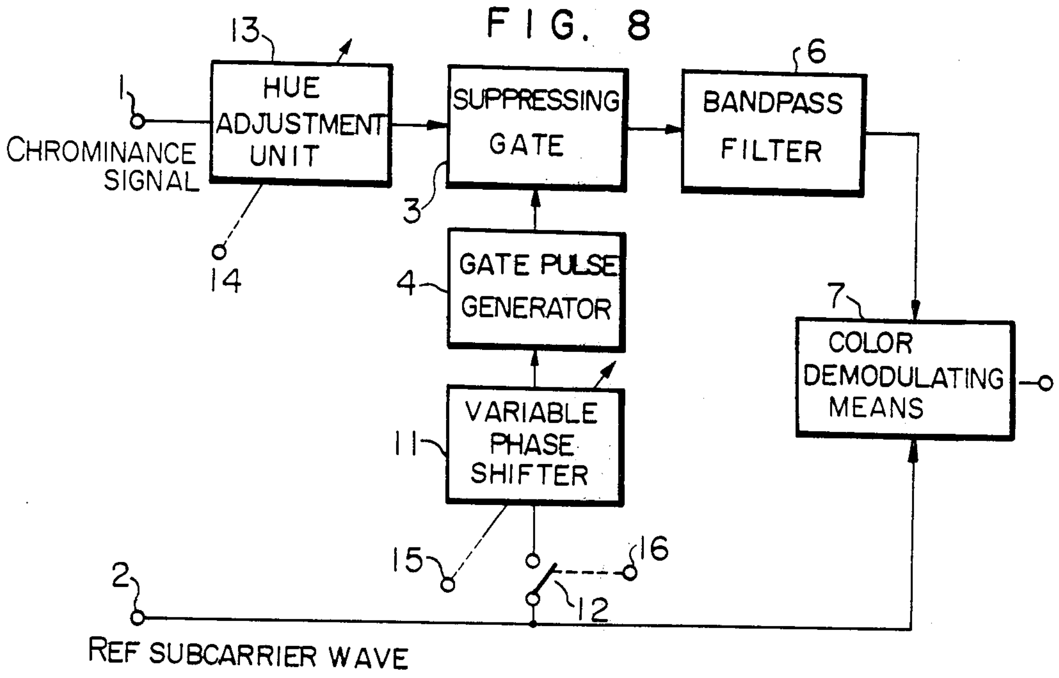
FIG. 8 is a block diagram showing a further embodiment of the invention.

FIG. 8 shows a further embodiment, which can simply meet this desire. In the Figure, parts 1, 2, 3, 4, 6 and 7 respectively correspond to those of like reference numerals in the FIG. 1 system. Numeral 11 designates a variable phase shifter, numeral 12 a switch for switching the phase compensating function, numeral 13 a usual hue adjustment unit for color television receivers, numeral 14 a manual knob ganged to the hue adjustment unit, numeral 15 a hue compensation adjustment knob ganged to the variable phase shifter 11 and accessible and operable from the outside of the receiver cabinet, and numeral 16 a switch knob to operate the switch 12.

With the switch 12 closed and the variable phase shifter 11 set to a given position, the phase relation that holds between the input to the suppressing gate 3 and output of the bandpass filter 6 is like that of curve A in FIG. 4. With the switch 12 open, the phase relation this time is like that of curve B in FIG. 4. In this state of the switch 12, the hue adjustment knob may be operated to adjust the hue so as to match it to one's taste. In this way, by the provision of the switch 12 and the phase adjustment unit 13 of the usual construction, it is possible to obtain operation without hue compensation and gradually vary the hue until one's taste is met.

While the phase adjustment unit 13 in the above embodiment is connected to the terminal 1, it is of course possible to connect the unit 13 to the terminal 2.

Figure 9:
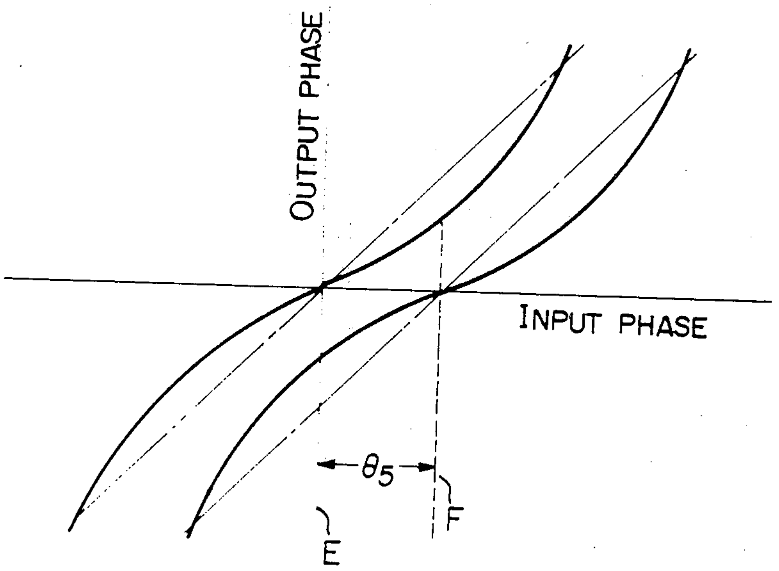
FIG. 9 is a graph showing input-output phase characteristics of the embodiment of FIG. 8.

By the operation of the hue compensation adjustment knob 15 ganged to the variable phase shifter 11, the hue, with respect to which the hue compensation is done, can be desirably varied. For example, the hue, with respect to which the hue compensation is done, is varied to a slightly yellowish human skin color F out of phase by $\theta_5$ from the true human skin hue, as shown in FIG. 9. In this case, hues in the vicinity of this slightly yellowish human skin hue are compensated with respect thereto.

The hue adjustment unit 13 or variable phase shifter 11 may be variable either continuously or stepwise. Also, a single knob may be used for the knobs 14 and 16 or for the knobs 15 and 14, and it may be made both rotatable and axially movable. Further, the hue adjustment unit 13 and variable phase shifter 11 may be based on direct adjustment, for instance through mechanical motion, or on indirect adjustment, for instance through d-c control. Furthermore, the hue compensation adjustment knob 15, which is operable from the outside of the receiver cabinet, may be disposed in such locality that it may be operated by any one without removing the back lid of the cabinet. For example, it may be made operable by opening a cabinet door provided on the front side of the cabinet.

Moreover, while the signals coupled to the terminal 1 in the systems of FIGS. 1, 7 and 8 have been the chrominance signal bearing phase information, this is by no means limitative. In other words, it is possible to provide the effect of phase compensating the signal added to the terminal 2 with respect to a particular phase so far as the phase relation between the signal added to the respective terminals 1 and 2 is subject to variations.

What is claimed is:

1. A phase compensating system comprising means to supply a phase modulated signal, means to produce a gate signal having a period in an integral multiple relation to the period of a reference carrier signal, a gating means to partly suppress said phase modulated signal to a reference level according to said gate signal, and means to derive a signal phase compensated with respect to a particular phase from the partly suppressed phase modulated signal from said gating means.

2. The phase compensating system according to claim 1, wherein said means to derive a signal phase compensated with respect to a particular phase comprises a bandpass filter having a pass band containing the fundamental frequency component of said phase modulating signal, said bandpass filter acting to remove harmonic components introduced into said phase modulated signal as it is partly suppressed in said gating means, thereby deriving only the fundamental frequency component of the output of said gating means.

3. The phase compensating system according to claim 1, wherein said gate signal producing means includes means to vary the gating period, whereby the extent of phase compensation of said phase compensated signal is variable by varying the period of suppression of said phase modulated signal.

4. The phase compensating system according to claim 1, which further comprises means to detect the amplitude of said phase modulated signal coupled to said gating means, and amplitude compensating means provided after said means to derive the phase compensated signal, the compensation degree of said amplitude compensating means being controlled according to the output of said amplitutde detecting means so as to obtain a signal proportional in amplitude to said phase modulated signal coupled to said gating means.

5. The phase compensating system according to claim 4, wherein said amplitude detecting means is constituted by an envelope detector and said amplitude compensating means is constituted by an amplitude comparison amplifier, the amplification degree of said amplitude comparison amplifier being automatically controlled on the basis of the detection of the amplitude level difference between the output of said phase compensated signal deriving means and a reference signal constituted by the output of said amplitude detecting means.

6. The phase compensating system according to claim 4, wherein said amplitude compensating means comprises a limiter circuit and an amplitude modulator for amplitude modulating the input thereto according to the output of said amplitude detecting means.

7. The phase compensating means according to claim 1, said phase modulated signal being a chrominance signal, a reference subcarrier wave being coupled to said gate signal producing means to produce a gate signal in a predetermined phase relation to said reference subcarrier wave, and a color demodulation means being connected after said phase compensated signal deriving means.

8. The phase compensating system according to claim 7, wherein the phase of the gate signal produced from said gate signal producing means is set such that said particular phase corresponds to the human skin hue.

9. The phase compensating system according to claim 8, which further comprises a variable phase shifter, the phase of the reference subcarrier wave added to said gate signal producing means being variable through said variable phase shifter.

10. The phase compensating system according to claim 9, which further comprises a switch for switching on and off the function of said gate signal producing means and a hue adjustment means for manually controlling the phase of said chrominance signal.

* * * * *